United States Patent
Cho et al.

(10) Patent No.: US 9,727,223 B2
(45) Date of Patent: Aug. 8, 2017

(54) APPARATUS AND METHOD OF PROVIDING ITEMS BASED ON SCROLLING

(71) Applicant: SAMSUNG ELECTRONICS CO., LTD., Suwon-si, Gyeonggi-do (KR)

(72) Inventors: Sung-jung Cho, Seoul (KR); Chang-kyu Choi, Seongnam-si (KR); Yeun-bae Kim, Seongnam-si (KR); Kyu-yong Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 541 days.

(21) Appl. No.: 13/856,917

(22) Filed: Apr. 4, 2013

(65) Prior Publication Data

US 2013/0227465 A1    Aug. 29, 2013

Related U.S. Application Data

(63) Continuation of application No. 12/007,126, filed on Jan. 7, 2008, now Pat. No. 8,429,555.

(30) Foreign Application Priority Data

Mar. 8, 2007   (KR) ..................... 10-2007-0023119

(51) Int. Cl.
*G06F 3/0481* (2013.01)
*G06F 3/0485* (2013.01)

(52) U.S. Cl.
CPC .......... *G06F 3/0485* (2013.01); *G06F 3/0481* (2013.01); *G06F 3/04855* (2013.01)

(58) Field of Classification Search
CPC ... G06F 3/0485; G06F 3/04855; G06F 3/0481
See application file for complete search history.

(56) References Cited

U.S. PATENT DOCUMENTS

| | | | | |
|---|---|---|---|---|
| 5,712,995 A | * | 1/1998 | Cohn | ........................... 715/792 |
| 5,889,517 A | * | 3/1999 | Ueda | ....................... G09G 5/14 |
| | | | | 715/803 |
| 5,920,315 A | | 7/1999 | Santos-Gomez | |

(Continued)

FOREIGN PATENT DOCUMENTS

| | | |
|---|---|---|
| JP | 2004-193795 | 7/2004 |
| JP | 2005-39486 | 2/2005 |

(Continued)

OTHER PUBLICATIONS

Office Action for U.S. Appl. No. 12/007,126 mailed Oct. 27, 2010.
(Continued)

*Primary Examiner* — Eric J Bycer
(74) *Attorney, Agent, or Firm* — Staas & Halsey LLP

(57) ABSTRACT

Disclosed is an apparatus and method of providing items based on scrolling.

An apparatus for processing data of a non-volatile memory according to an aspect of the invention includes a scrolling detecting unit detecting scrolling for one or more items that are displayed on a screen, a screen region control unit dividing the screen into one or more regions according to the detected scrolling, and controlling the sizes of the divided regions, and an item control unit controlling at least one of the sizes and the number of items according to the sizes of the divided regions.

10 Claims, 11 Drawing Sheets

(56) References Cited

U.S. PATENT DOCUMENTS

| | | | |
|---|---|---|---|
| 6,034,688 A | 3/2000 | Greenwood et al. | |
| 6,064,376 A | 5/2000 | Berezowski et al. | |
| 6,268,854 B1* | 7/2001 | Borden | G06F 3/04855 345/661 |
| 6,281,897 B1 | 8/2001 | Berry et al. | |
| 6,437,811 B1 | 8/2002 | Battles et al. | |
| 6,590,583 B2 | 7/2003 | Soohoo | |
| 6,747,680 B1* | 6/2004 | Igarashi et al. | 715/784 |
| 6,943,811 B2 | 9/2005 | Matthews | |
| 6,983,424 B1* | 1/2006 | Dutta | 715/800 |
| 7,050,072 B2 | 5/2006 | Lipsky et al. | |
| 7,080,326 B2* | 7/2006 | Molander et al. | 715/788 |
| 7,165,227 B2 | 1/2007 | Ubillos | |
| 7,391,423 B1* | 6/2008 | Manzari et al. | 345/619 |
| 7,433,546 B2 | 10/2008 | Marriott et al. | |
| 7,454,711 B2 | 11/2008 | Anguilo et al. | |
| 7,536,654 B2 | 5/2009 | Anthony et al. | |
| 7,552,187 B2 | 6/2009 | Fuchs | |
| 7,587,683 B2 | 9/2009 | Ito et al. | |
| 7,761,812 B2 | 7/2010 | Ostojic et al. | |
| 7,802,206 B1* | 9/2010 | Davis et al. | 715/864 |
| 8,002,633 B2 | 8/2011 | Shimizu | |
| 8,429,555 B2* | 4/2013 | Cho et al. | 715/784 |
| 2005/0005236 A1* | 1/2005 | Brown et al. | 715/520 |
| 2005/0190280 A1 | 9/2005 | Haas et al. | |
| 2005/0193094 A1 | 9/2005 | Robbin et al. | |
| 2005/0206658 A1* | 9/2005 | Fagans | 345/660 |
| 2005/0210399 A1 | 9/2005 | Filner et al. | |
| 2006/0020970 A1 | 1/2006 | Utsuki et al. | |
| 2006/0059441 A1* | 3/2006 | Todd | G06F 3/0482 715/853 |
| 2006/0181548 A1 | 8/2006 | Hafey et al. | |
| 2006/0224993 A1 | 10/2006 | Wong et al. | |
| 2006/0248470 A1 | 11/2006 | Lee et al. | |
| 2006/0271870 A1* | 11/2006 | Anwar | G06F 3/0481 715/764 |
| 2007/0011623 A1 | 1/2007 | Billmaier et al. | |
| 2007/0130525 A1 | 6/2007 | Murphy et al. | |
| 2007/0130538 A1* | 6/2007 | Chiu | 715/792 |
| 2007/0198476 A1* | 8/2007 | Farago | G06F 3/0485 |
| 2007/0250788 A1* | 10/2007 | Rigolet | 715/788 |
| 2008/0152298 A1* | 6/2008 | Ubillos | 386/52 |
| 2008/0155473 A1* | 6/2008 | Duhig | G06F 3/0482 715/818 |
| 2008/0155475 A1* | 6/2008 | Duhig | G06F 3/0482 715/830 |
| 2009/0100373 A1* | 4/2009 | Pixley | G06F 3/03543 715/786 |

FOREIGN PATENT DOCUMENTS

| | | |
|---|---|---|
| JP | 2005-275034 | 10/2005 |
| KR | 10-2002-0000714 | 1/2002 |
| KR | 10-2004-0071454 | 8/2004 |
| WO | 2007/020420 A1 | 2/2007 |

OTHER PUBLICATIONS

Office Action for U.S. Appl. No. 12/007,126 mailed Oct. 4, 2011.
Office Action for U.S. Appl. No. 12/007,126 mailed Feb. 16, 2012.
Notice of Allowance for U.S. Appl. No. 12/007,126 mailed Dec. 21, 2012.
Final Office Action mailed Mar. 2, 2011 in co-pending U.S. Appl. No. 12/007,126 (21 pages).
Advisory Action mailed Jul. 19, 2011 in co-pending U.S. Appl. No. 12/007,126 (3 pages).
Advisory Action mailed Apr. 24, 2012 in co-pending U.S. Appl. No. 12/007,126 (4 pages).
Korean Office Action issued May 29, 2013 in corresponding Korean Application No. 10-2007-0023119.

* cited by examiner

FIG. 1
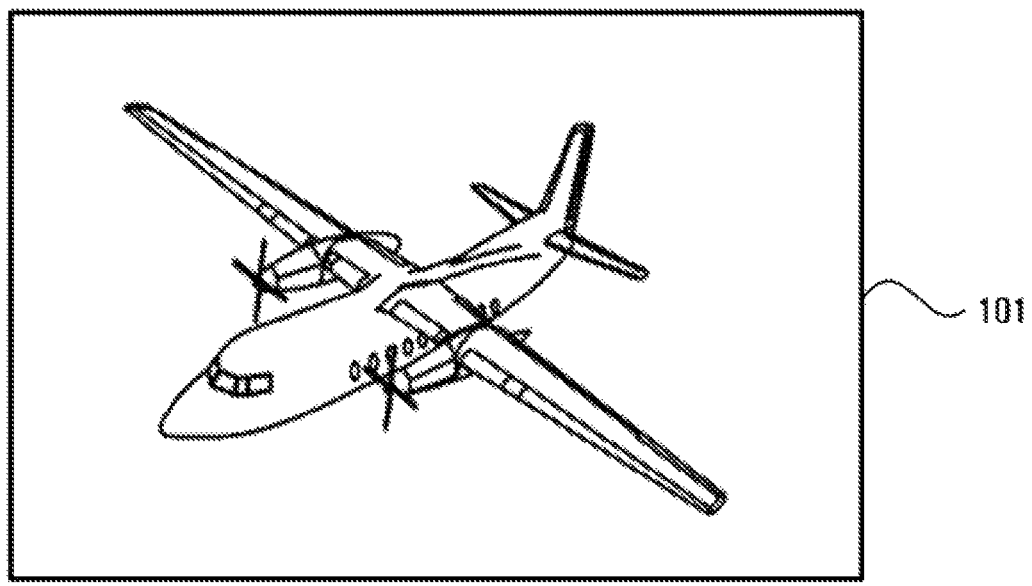
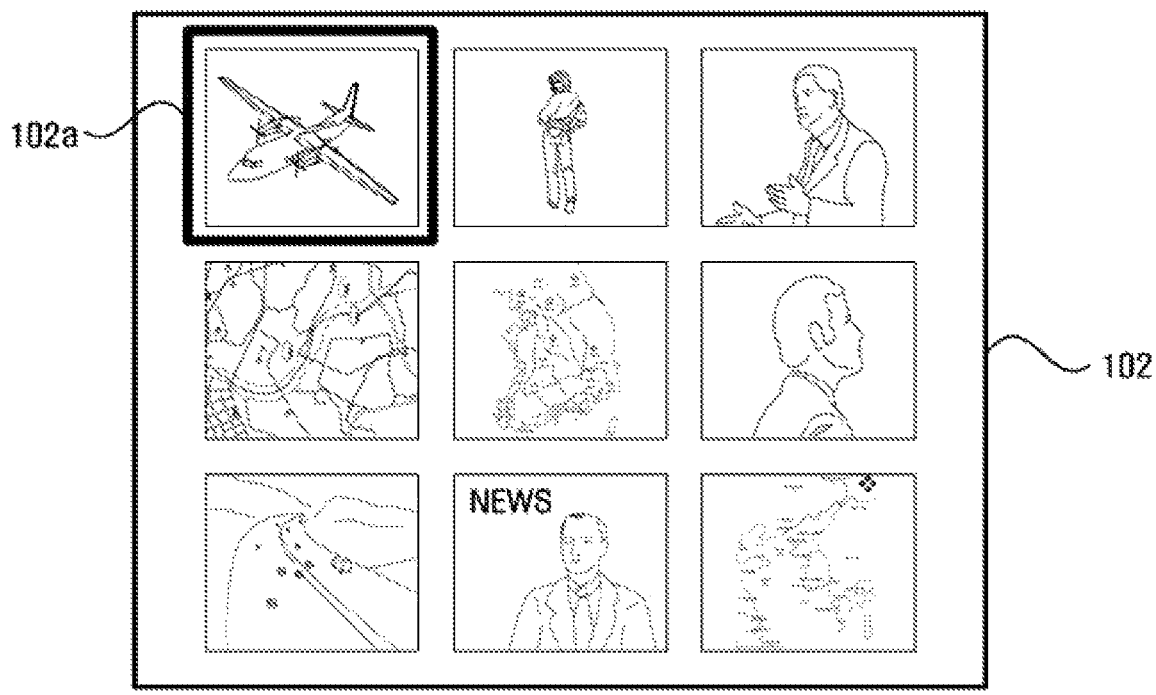

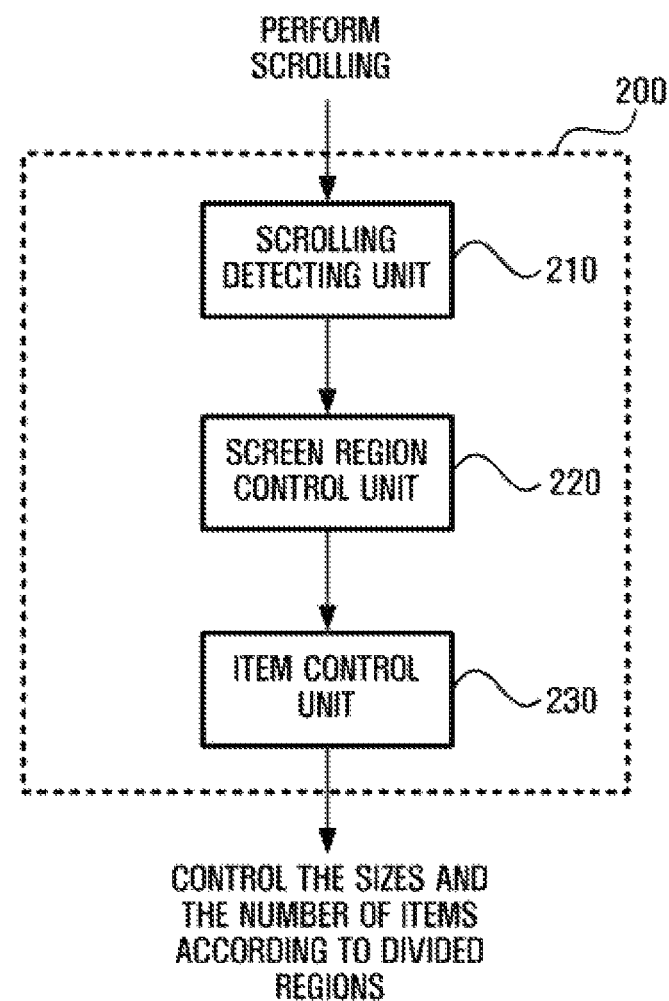

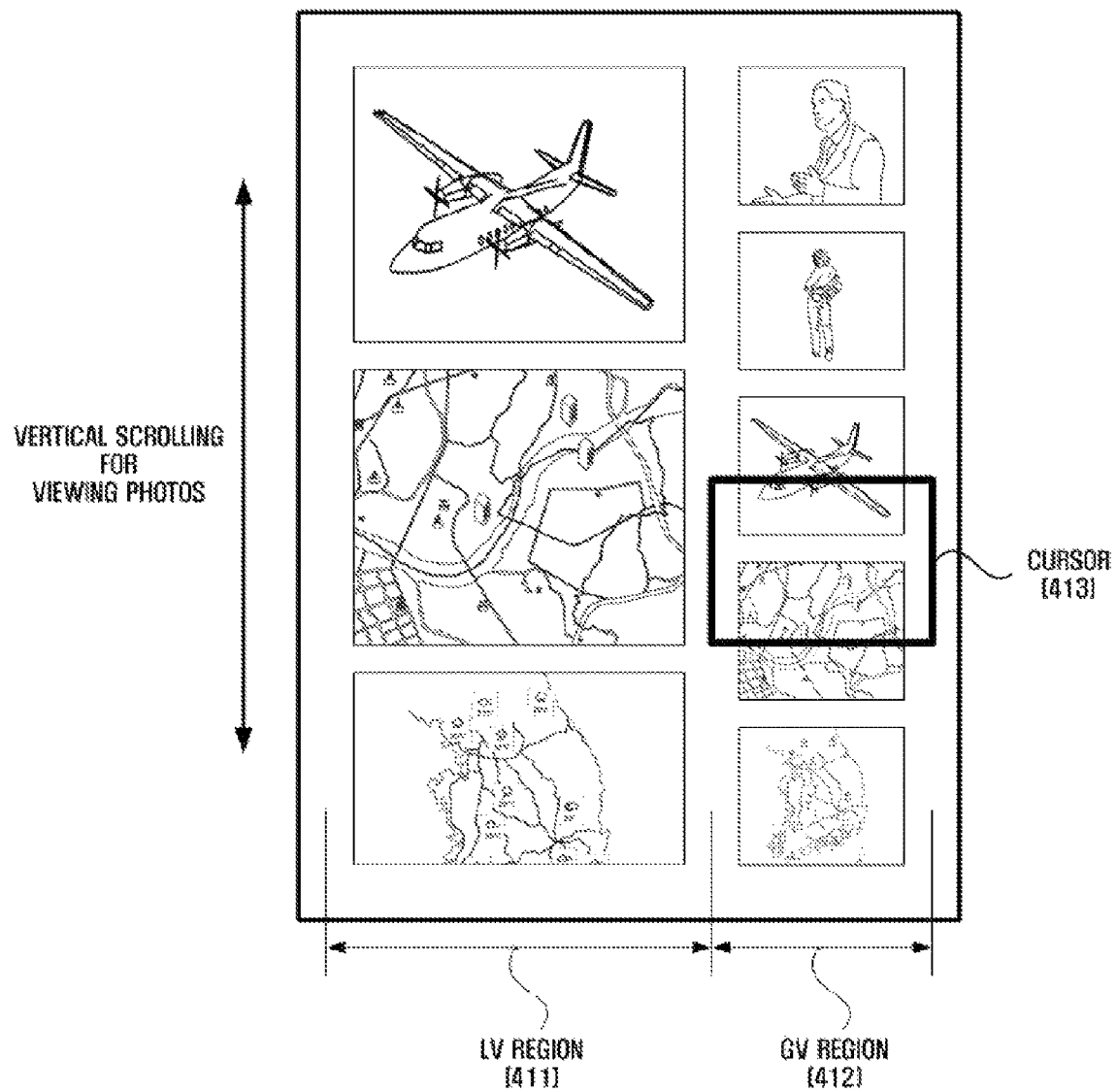

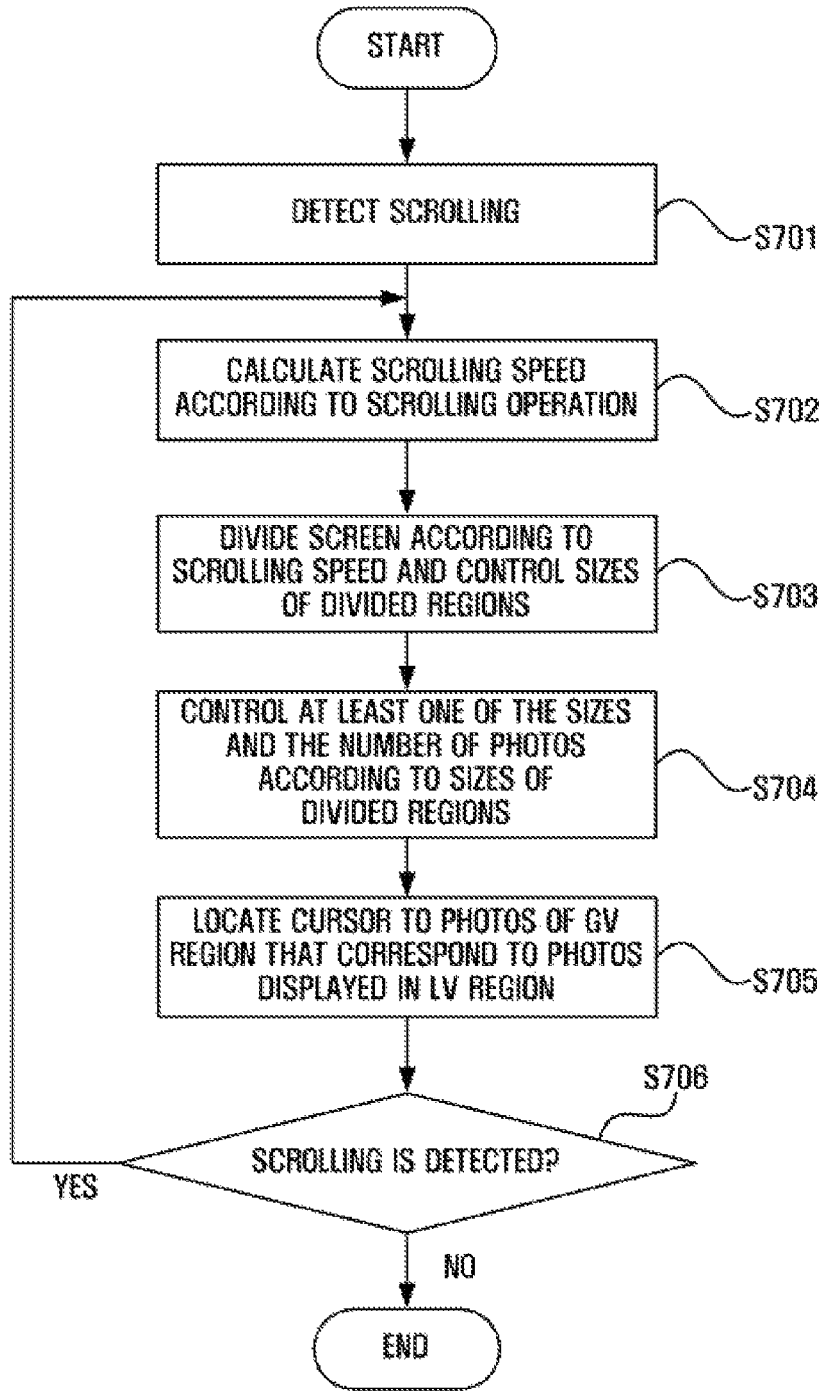

APPARATUS AND METHOD OF PROVIDING ITEMS BASED ON SCROLLING

CROSS REFERENCE TO RELATED APPLICATION

This application is a Continuation Application of U.S. application Ser. No. 12/007,126 filed Jan. 7, 2008, which claims priority from Korean Patent Application No. 10-2007-0023119 filed on Mar. 8, 2007, in the Korean Intellectual Property Office, the disclosures of each of which are incorporated herein by reference in its entirety.

BACKGROUND OF THE INVENTION

1. Field of the Invention

The present invention relates to an apparatus and method of providing items based on scrolling. More particularly, the present invention relates to an apparatus and method of variably displaying a list structure of all items and detailed information of individual items according to a scrolling speed, in a case in which items of a list form, such as images, photos, documents, and menus, are scrolled on information apparatuses, such as a portable terminal, a PC, and a TV.

2. Description of the Related Art

In general, a user views or searches photos using information apparatuses, such as a portable terminal, a PC, and a TV.

In order to allow the user to view the photos, the photos need to be displayed as large as possible. In order to allow the user to search the photos, the photos need to be displayed in the form of thumbnails so that the user may view the photos at a glance.

FIG. 1 is a diagram illustrating a form of photos that are generally displayed on a screen of an information apparatus.

In FIG. 1, in order to allow a user to view a photo, one photo is displayed on an entire screen of an information apparatus (refer to reference numeral 101). Further, in order to allow the user to search a plurality of photos, the plurality of photos are displayed on a screen of the information apparatus in the form of thumbnails (refer to reference numeral 102).

However, when the photo that has the same size as the screen is displayed on the screen (refer to reference numeral 101), the user can only view one photo on the screen. For this reason, it is not possible for the user to view the other photos, such as the previous photo or the photo after. When the plurality of photos are displayed in the form of thumbnails (refer to reference numeral 102), the user can easily search the photos. However, in order to view the photos in detail, the user should convert the size of each of the photos into the same size as the screen.

As described above, the user views or searches the photos using the information apparatus. Therefore, it has been required to develop a technology that allows the user to view and search the photos and allows a mode conversion to be performed from a photo viewing mode to a photo searching mode or from the photo searching mode to the photo viewing mode to be easily performed. To solve this problem, controlling the sizes of the photos for viewing the photos, that is, zoom-in and zoom-out of the photos, and movement of the photos for searching the photos, that is, scrolling need to be connectedly associated with each other.

SUMMARY OF THE INVENTION

An object of the invention is to provide an apparatus and method of providing items based on scrolling that allows a user to view or search photos.

Another object of the invention is to provide an apparatus and method of providing items based on scrolling that allows a mode conversion to be performed from a photo viewing mode to a photo searching mode or from the photo searching mode to the photo viewing mode to be easily performed.

Objects of the invention are not limited to those mentioned above, and other objects of the invention will be apparently understood by those skilled in the art through the following description.

According to one aspect of the invention, there is provided an apparatus for providing items based on scrolling, the apparatus including a scrolling detecting unit detecting scrolling for one or more items that are displayed on a screen, a screen region control unit dividing the screen into one or more regions according to the detected scrolling, and controlling the sizes of the divided regions, and an item control unit controlling at least one of the sizes and the number of items according to the sizes of the divided regions.

According to another aspect of the invention, there is provided a method of providing items based on scrolling, the method including detecting scrolling for one or more items that are displayed on a screen, dividing the screen into one or more regions according to the detected scrolling, and controlling the sizes of the divided regions, and controlling at least one of the sizes and the number of items according to the sizes of the divided regions.

BRIEF DESCRIPTION OF THE DRAWINGS

The above and other features and advantages of the invention will become more apparent by describing in detail preferred embodiments thereof with reference to the attached drawings in which:

FIG. 1 is a diagram illustrating a form of photos that are generally displayed on a screen of an information apparatus;

FIG. 2 is a diagram illustrating a structure of an apparatus for providing items based on scrolling according to an embodiment of the invention;

FIG. 4 is a diagram illustrating an aspect where a screen region is divided by a screen region control unit according to another embodiment of the invention;

FIG. 7 is a flowchart illustrating a process of providing items based on scrolling according to an embodiment of the invention.

DESCRIPTION OF THE PREFERRED EMBODIMENTS

Figure 3A:
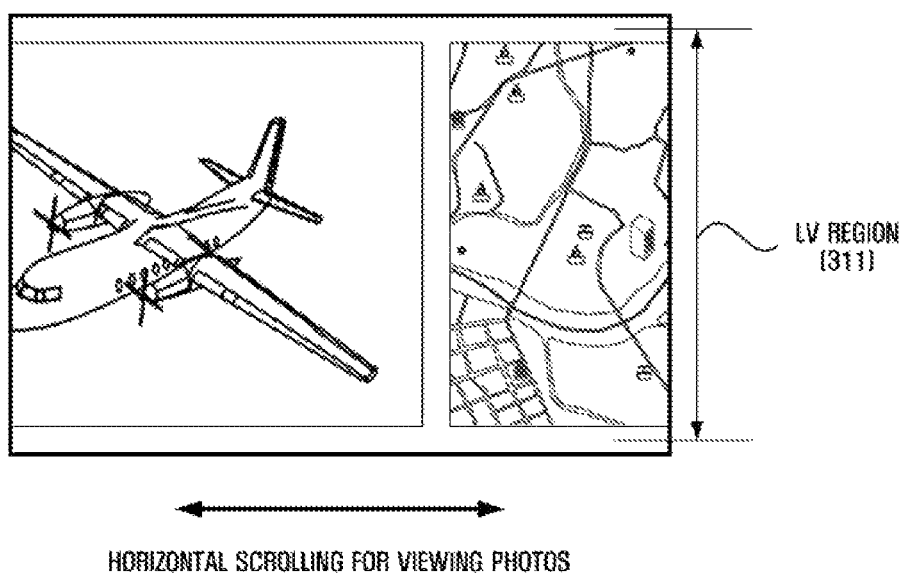
FIGS. 3A to 3D are diagrams illustrating aspects where a screen region is divided by a screen region control unit according to an embodiment of the invention.

Advantages and features of the invention and methods of accomplishing the same may be understood more readily by reference to the following detailed description of preferred embodiments and the accompanying drawings.

The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

Like identification codes refer to like elements throughout the specification.

The invention will be described hereinafter with reference to block diagrams or flowchart illustrations of an apparatus and method of providing items based on scrolling according to exemplary embodiments thereof.

It is to be understood that blocks in the accompanying block diagrams and compositions of steps in flow charts can be performed by computer program instructions.

These computer program instructions can be loaded onto processors of, for example, general-purpose computers, special-purpose computers, and programmable data processing apparatuses. Therefore, the instructions performed by the computer or the processors of the programmable data processing apparatus generate means for executing functions described in the blocks of block diagrams or the steps in the flow charts.

The computer program instructions can be stored in a computer available memory or a computer readable memory of the computer or the programmable data processing apparatus in order to realize the functions in a specific manner. Therefore, the instructions stored in the computer available memory or the computer readable memory can manufacture products including the instruction means for performing the functions described in the blocks in the block diagrams or the steps in the flow charts.

Further, the computer program instructions can be loaded onto the computer or the computer programmable data processing apparatus. Therefore, a series of operational steps is performed in the computer or the programmable data processing apparatus to generate a process executed by the computer, which makes it possible for the instructions driving the computer or the programmable data processing apparatus to provide steps of executing the functions described in the blocks of the block diagrams or the steps of the flow charts.

Each block or each step may indicate a portion of a module, a segment or a code including one or more executable instructions for performing a specific logical function (or functions).

It should be noted that, in some modifications of the invention, the functions described in the blocks or the steps may be generated out of order.

For example, two blocks or steps continuously shown can be actually performed at the same time, or they can sometimes be performed in reverse order according to the corresponding functions.

The invention will now be described more fully with reference to the accompanying drawings, in which preferred embodiments of the invention are shown.

FIG. 2 is a diagram illustrating a structure of an apparatus for providing items based on scrolling according to an embodiment of the invention.

An apparatus 200 for providing items based on scrolling according to an embodiment of the invention (hereinafter, simply referred to as apparatus 200) includes a scrolling detecting unit 210, a screen region control unit 220, and an item control unit 230. The scrolling detecting unit 210 detects scrolling for one or more items that are displayed on a screen. The screen region control unit 220 divides the screen into one or more regions according to the detected scrolling and controls sizes of the divided regions. The item control unit 230 controls at least one of the sizes and the number of items according to the sizes of the divided regions.

Meanwhile, components according to the embodiment of the invention shown in FIG. 2 mean software, or a hardware component such as an FPGA (Field Programmable Gate Array) or an ASIC (Application Specific Integrated Circuit) and the components each perform assigned functions.

However, the modules are not limited to software or hardware. The modules may be configured in an addressable storage medium, or may be configured to run on at least one processor.

Therefore, as an example, the modules include: components such as software components, object-oriented software components, class components, and task components; processors, functions, attributes, procedures, sub-routines, segments of program codes, drivers, firmware, microcodes, circuits, data, databases, data structures, tables, arrays, and variables.

The functions provided by the components and the modules may be combined into fewer components and/or modules may be separated into additional components and modules.

In the apparatus 200 shown in FIG. 2, the scrolling detecting unit 210 detects the scrolling for one or more items that are displayed on the screen.

Here, the items include at least one of one or more images, photos, documents, and menus. For convenience of explanation, the photos are used as the items in this embodiment.

Further, the screen means a screen of an information apparatus, such as a portable terminal, a PC, and a TV. For convenience of explanation, a screen of a portable terminal, such as a digital camera, a cellular phone, a PMP, and a PDA, is used as the screen in this embodiment.

For reference, in the case of the TV, a user holds a control device, such as a remote controller having a sensor mounted therein, and performs a scrolling operation, and a screen of the TV may be used as it is.

The above-described items and screen are not limited to those in the embodiments of the invention, and various changes and modifications can be made.

The scrolling, which is detected by the scrolling detecting unit 210, is performed by any one of the motion of a mouse in a PC, an inclination of a portable terminal, and the movement of an object (a portion of a body, such as fingers, and a stylus pen), which comes into contact with a screen of an information apparatus, when the screen is composed of a touch screen. The scrolling detecting unit 210 calculates a scrolled amount according to the above-described scrolling operation.

For reference, when the scrolling is performed by the inclination of the portable terminal, the scrolling detecting unit 210 calculates the scrolling speed on the basis of data that is collected from various sensors, such as a triaxial acceleration sensor and an angular speed sensor.

The screen region control unit 220 divides the screen into one or more regions according to the scrolled amount which has been detected by the scrolling detecting unit 210, and controls the sizes of the divided regions.

In this case, the screen regions, which are divided by the screen region control unit 220, include at least one of a first region and a second region. In the first region, a plurality of photos are displayed in the form of thumbnails whose sizes are fixed to have predetermined sizes, and in the second region, one or more photos are enlarged to have predetermined sizes and displayed.

In this embodiment, the first region is a region where a plurality of photos are displayed in the form of thumbnails for a user to search the photos, and a global structure for an entire list can be seen. Therefore, the first region is referred to as a global view (hereinafter, referred to as GV) region. Meanwhile, the second region is a region where photos are enlarged and displayed for a user to view the photos and thus the user can view only one photo and a portion of a photo adjacent to one photo. Therefore, the second region is referred to as a local view (LV) region.

That is, the screen region control unit 220 calculates the sizes of the GV region and the LV region according to the scrolling speed that has been calculated by the scrolling detecting unit 210, and determines a zoom level in the LV region according to the size of the LV region.

At this time, the screen region control unit 220 enlarges the GV region in proportion to the scrolling speed, and enlarges the LV region to be inversely proportional to the scrolling speed.

This reason is as follows. Since the users desire to view the photos in detail for a sufficiently long time, the users generally view the photos while scrolling through the photos at a low speed.

Accordingly, when the scrolling speed is low or decreased, the screen region control unit 220 determines that the user desires to view the photos. The screen region control unit 220 allows the LV region to be enlarged, such that the photos are enlarged and displayed for the user to view the photos in detail.

In contrast, when the scrolling speed is fast or increased, the screen region control unit 220 determines that the user desires to search the photos instead of viewing the photos in detail. The screen region control unit 220 allows the GV region to be enlarged, such that the photos are displayed in the form of thumbnails for the user to search the photos.

At this time, in a state where the lengths of the GV region and the LV region in a horizontal direction are fixed, the screen region control unit 220 controls the lengths of the GV region and the LV region in a vertical direction and enlarges or reduces each of the GV region and the LV region.

As described above, the screen region control unit 220 calculates the sizes of the GV region and the LV region according to the scrolling speed, which has been calculated by the scrolling detecting unit 210, and divides the screen. Further, the screen region control unit 220 determines the zoom level in the LV region according to the size of the LV region. Therefore, there is a correlation between the scrolling speed and the zoom level of the LV region.

In order to represent the correlation between the scrolling speed and the zoom level of the LV region in an equation, it is assumed that the scrolling speed, which is calculated by the scrolling detecting unit 210, is v(t), and the zoom level in the LV region is z(t). The correlation can be represented by Equation 1.

$$z(t)=f(v(t))$$ [Equation 1]

At this time, the screen region control unit 220 enlarges the size of the LV region to be inversely proportional to the scrolling speed. Therefore, a function f(v(t)) that determines the zoom level z(t) in Equation 1 is preferably inversely proportional to the scrolling speed v(t), and this relation can be represented by Equation 2.

$$z(t)=1/v(t)$$ [Equation 2]

Accordingly, when the scrolling speed is fast or increased, the LV region is reduced and the zoom level is decreased. As a result, the photos that are displayed in the LV region are also reduced and displayed.

Further, when the scrolling speed is low or decreased, the LV region is enlarged and the zoom level is increased. As a result, the photos that are displayed in the LV region are also enlarged and displayed.

If the condition z(t)<1 is satisfied, the LV region is reduced in the screen, and the GV region is enlarged by the amount of the LV region that has been reduced.

Meanwhile, the item control unit 230 controls at least one of the sizes and the number of the photos according to the sizes of the GV region and the LV region, which are divided by the screen region control unit 220.

For example, when the scrolling speed is decreased, the screen region control unit 220 decreases the size of the GV region. The item control unit 230 decreases the number of photos that are in the form of thumbnails, whose sizes are fixed to have predetermined sizes, in proportion to the decreased size of the GV region, and displays the photos.

At this time, the reason why the number of photos that are in the form of thumbnails is only decreased without decreasing the sizes of the photos in proportion to the decreased size of the GV region is as follows. This is because the size of each of photos that are in the form of thumbnails is a minimum size to enable the user to easily search the photos.

In this case, if it is assumed that a size of a photo in a form of a thumbnail is 1/T times a size of an original photo and the height of the GV region is H, the number of rows, where the photos that are in the form of thumbnails can be displayed in the GV region, becomes H*T.

At this time, the photos that are in the form of thumbnails, which are displayed in the H*T rows in the GV region, are located at predetermined intervals. As a result, the user can easily memorize the entire structure of all of the photos.

If the user scrolls through the photos to view the photos and the photos move in the LV region, the item control unit 230 causes a cursor to be located at a photo, which is in a form of a thumbnail in the GV region and corresponds to the photo currently displayed in the LV region.

If an area of the GV region is insufficient, all photos, which the user desires to view, cannot be displayed in the form of thumbnails in the GV region. In this case, the item control unit 230 displays some photos that are in the form of thumbnails, in the H*T rows in the GV region. A portion or all of the other photos, which are not displayed in the GV region, are displayed in the GV region and the screen is updated, when the cursor is out of the GV region for the cursor to move from the last photo displayed in the GV region to another photo.

At this time, as for the method of updating displayed photos, the uppermost row of the H*T rows may only be updated, the lowermost row may only be updated, or all the H*T rows may be updated.

As described above, the reason why the photos displayed in the LV region are indicated by the cursor in the GV region is as follows. The photos, which are in the form of thumbnails and are displayed on the screen, are fixed on the screen and the cursor only moves. In this way, the user minimizes visual fatigue in the GV region even though the photos are scrolled at a high speed in the LV region.

Further, the item control unit 230 changes the sizes and the number of photos according to the changed size of the LV region, and displays the photos.

Different from the GV region, the cursor does not exist in the LV region, and the photos move by scrolling. Further, in the LV region, the photos are enlarged or reduced by the item control unit 230 according to the changed size of the LV region.

At this time, the photos, which are enlarged or reduced in the LV region, are enlarged or reduced having a predetermined aspect ratio. Therefore, when the LV region is enlarged, the displayed photos are also enlarged having a predetermined aspect ratio. Accordingly, when the scrolling speed decreases and the LV region is enlarged, the photo is enlarged. As a result, the user can view the corresponding photo in detail.

In contrast, when the LV region is reduced, the displayed photos are also reduced with a predetermined aspect ratio. As a result, a large amount of photos are displayed in the LV region, as compared with the case before the LV region is reduced.

In general, the photos are preferably reduced with a predetermined aspect ratio. However, in some cases, the photos may be enlarged or reduced with a different aspect ratio according to the size of the LV region.

According to the method in which the item control unit 230 displays the photos in the LV region, the entire LV region is immediately controlled by the item control unit 230. As a result, the control of the operation can be desirably performed by the user.

FIGS. 3A to 3D are diagrams illustrating aspects where a screen region is divided by a screen region control unit according to an embodiment of the invention.

For convenience of explanation, it is assumed that the user performs scrolling at a gradually increasing speed to search the photos after viewing the photos.

FIG. 3A is a diagram illustrating a state where scrolling is rarely performed, that is, a scrolling speed is approximately 0, in a case where a user views photos using horizontal scrolling.

Accordingly, the screen region control unit 220 allocates the entire screen to the LV region 311, and determines a zoom level that corresponds to the size of the LV region 311. Then, the item control unit 230 controls the sizes of the photos according to the size of the LV region and displays the photos.

Figure 3B:
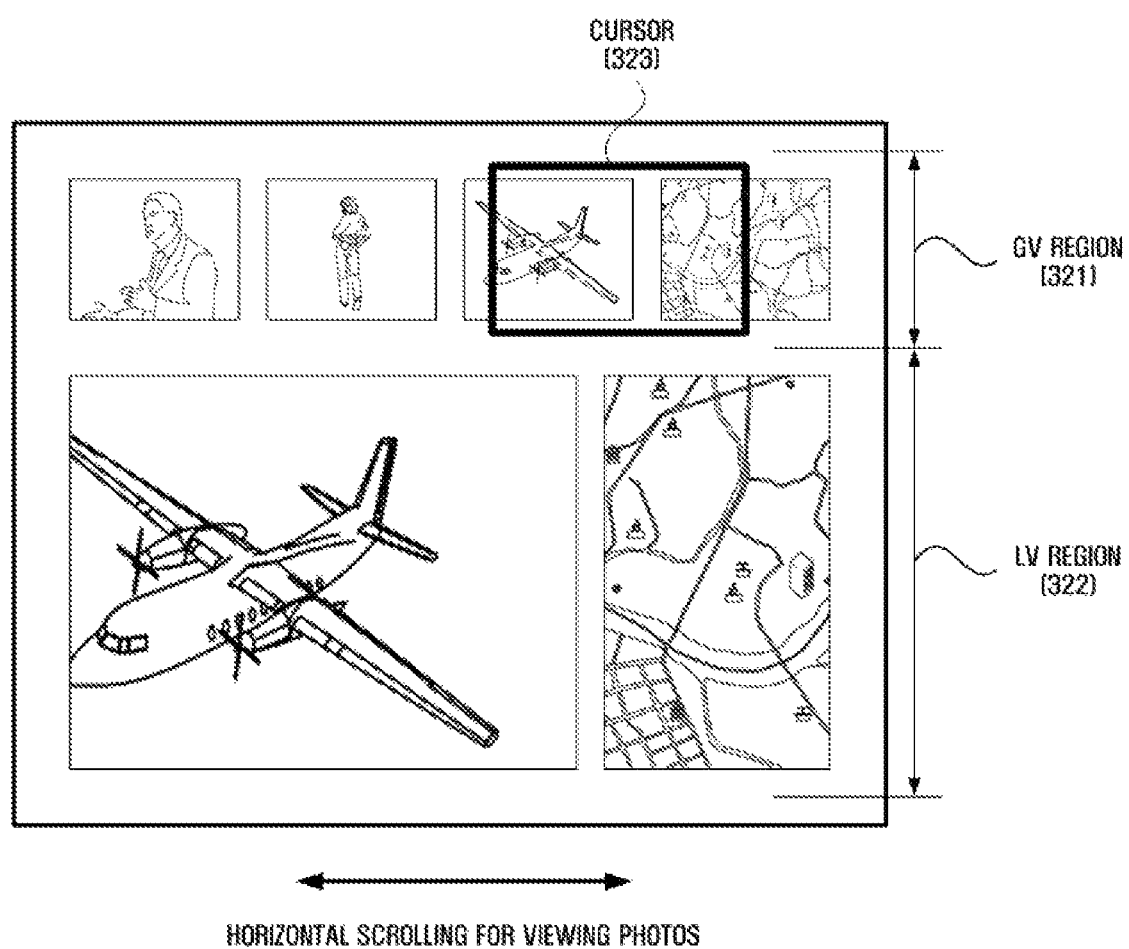

FIG. 3B is a diagram illustrating a state where a user moves photos using horizontal scrolling. In this case, the screen region control unit 220 divides the screen into the GV region 321 and the LV region 322 according to the scrolling speed.

In the state where the scrolling speed is approximately 0, the user performs scrolling to view a next photo. Therefore, according to the scrolling speed, the LV region 322 is reduced to be smaller than the LV region 311 shown in FIG. 3A, and the GV region 321 is enlarged by the amount of the LV region 322 that has been reduced.

That is, from FIG. 3B, it can be understood that a great deal of weight is given to the photo viewing rather than the photo searching because the LV region 322 for viewing the photos is enlarged to be larger than the GV region 321 for searching the photos.

In the GV region 321, the photos, which are in the form of thumbnails and correspond to the photos displayed in the LV region 322, are indicated by the cursor 323.

Figure 3C:
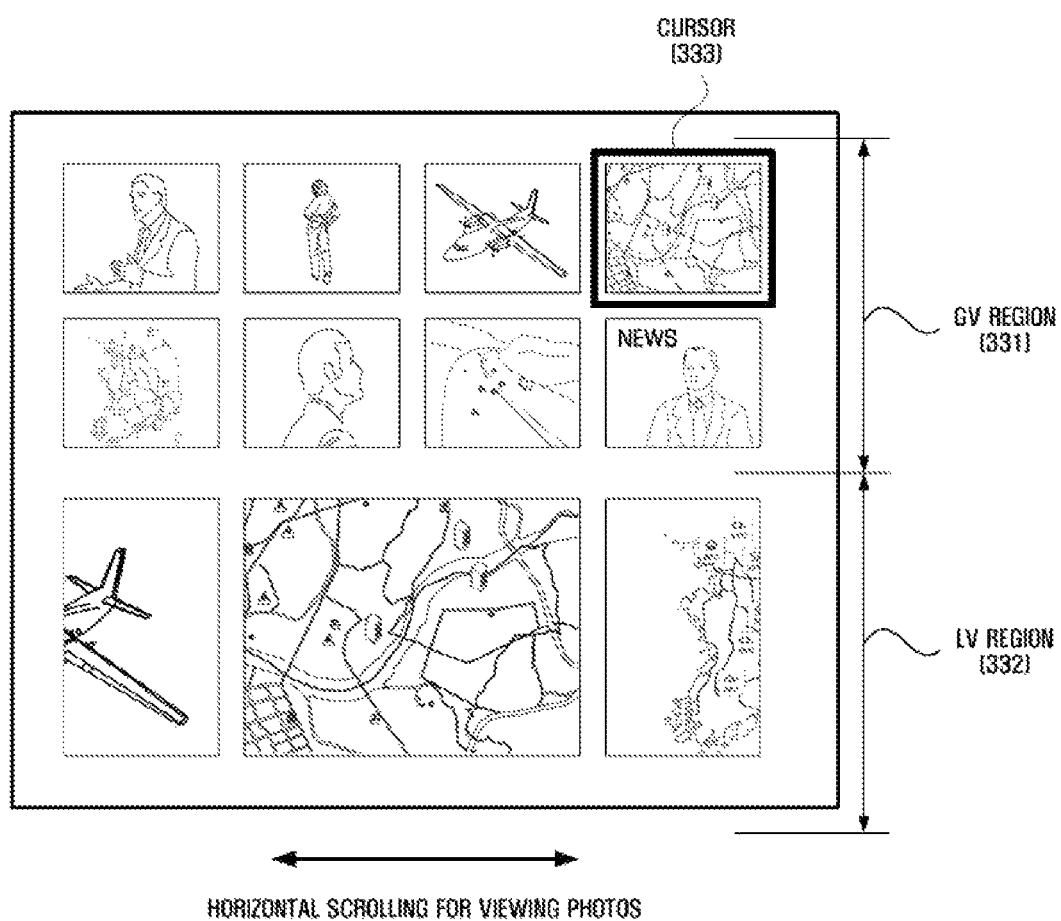

FIG. 3C is a diagram illustrating a state where using horizontal scrolling, a user moves photos by performing scrolling at a speed faster than that in the case shown in FIG. 3B. In this case, the screen region control unit 220 divides the screen into the GV region 331 and the LV region 332 according to the scrolling speed.

Referring to FIGS. 3B and 3C, the aspects where the GV and LV regions 321 and 322 and the GV and LV regions 331 and 332 are divided according to the scrolling speed are compared with each other. In the case of FIG. 3C where the scrolling speed is faster than that in the case of FIG. 3B, the GV region 331 for searching the photos is enlarged more than the GV region 321 of FIG. 3B, and the LV region 332 for viewing the photos is reduced more than the LV region 322 of FIG. 3B.

In the GV region 331, the photo, which is in a form of a thumbnail and corresponds to the photo displayed in the LV region 332, is indicated by the cursor 333.

Figure 3D:
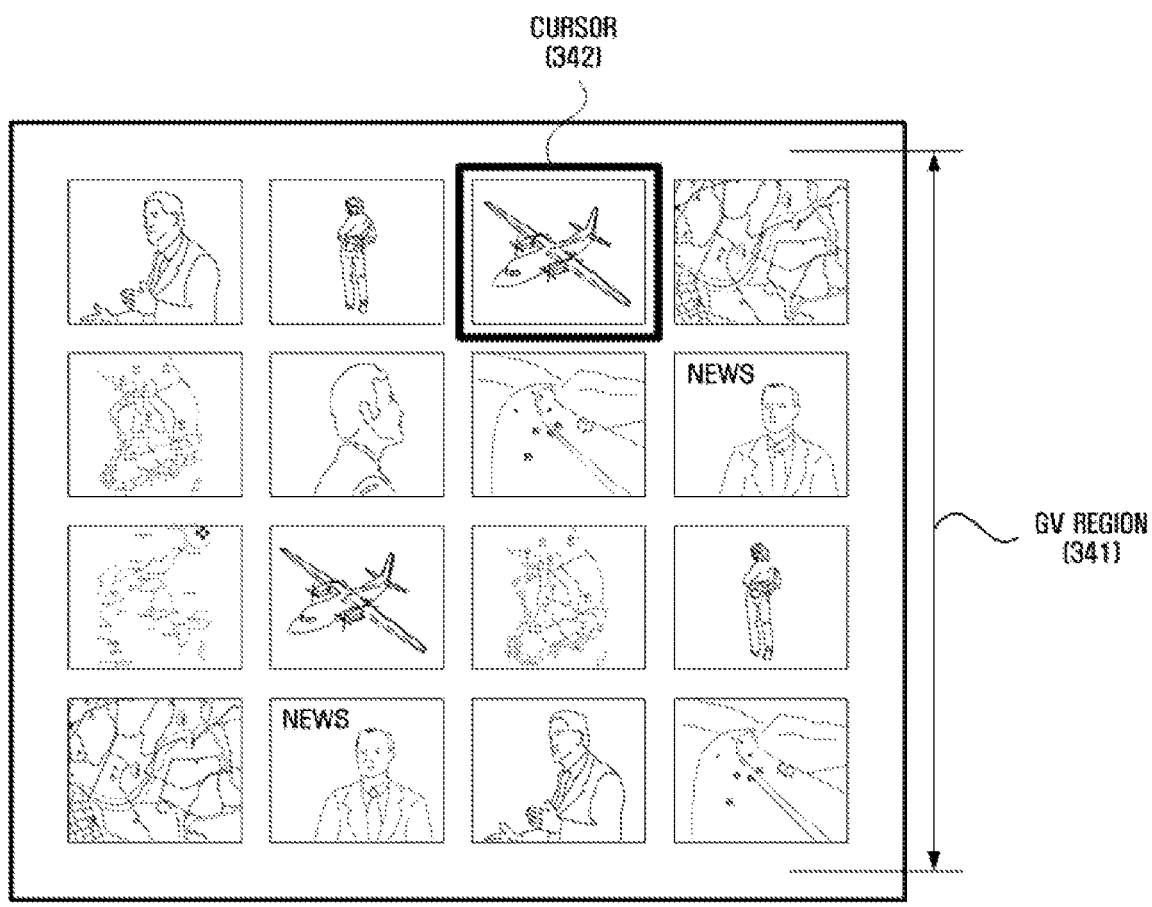

FIG. 3D is a diagram illustrating a state where using horizontal scrolling, a user moves photos by performing scrolling at a speed faster than that in the case shown in FIG. 3C. In this case, the screen region control unit 220 allocates the entire screen to the GV region 341 according to the scrolling speed.

Then, the item control unit 230 controls the number of photos, which are in the form of thumbnails whose sizes are fixed to have predetermined sizes according to the size of the GV region 341, and displays the photos in the GV region 341.

FIG. 4 is a diagram illustrating an aspect where a screen region is divided by a screen region control unit according to another embodiment of the invention.

The aspect shown in FIG. 4 where the screen is divided is the same as those shown in FIGS. 3A to 3D, except that a user moves photos in an LV region 411 for viewing the photos by using vertical scrolling.

Figure 5:
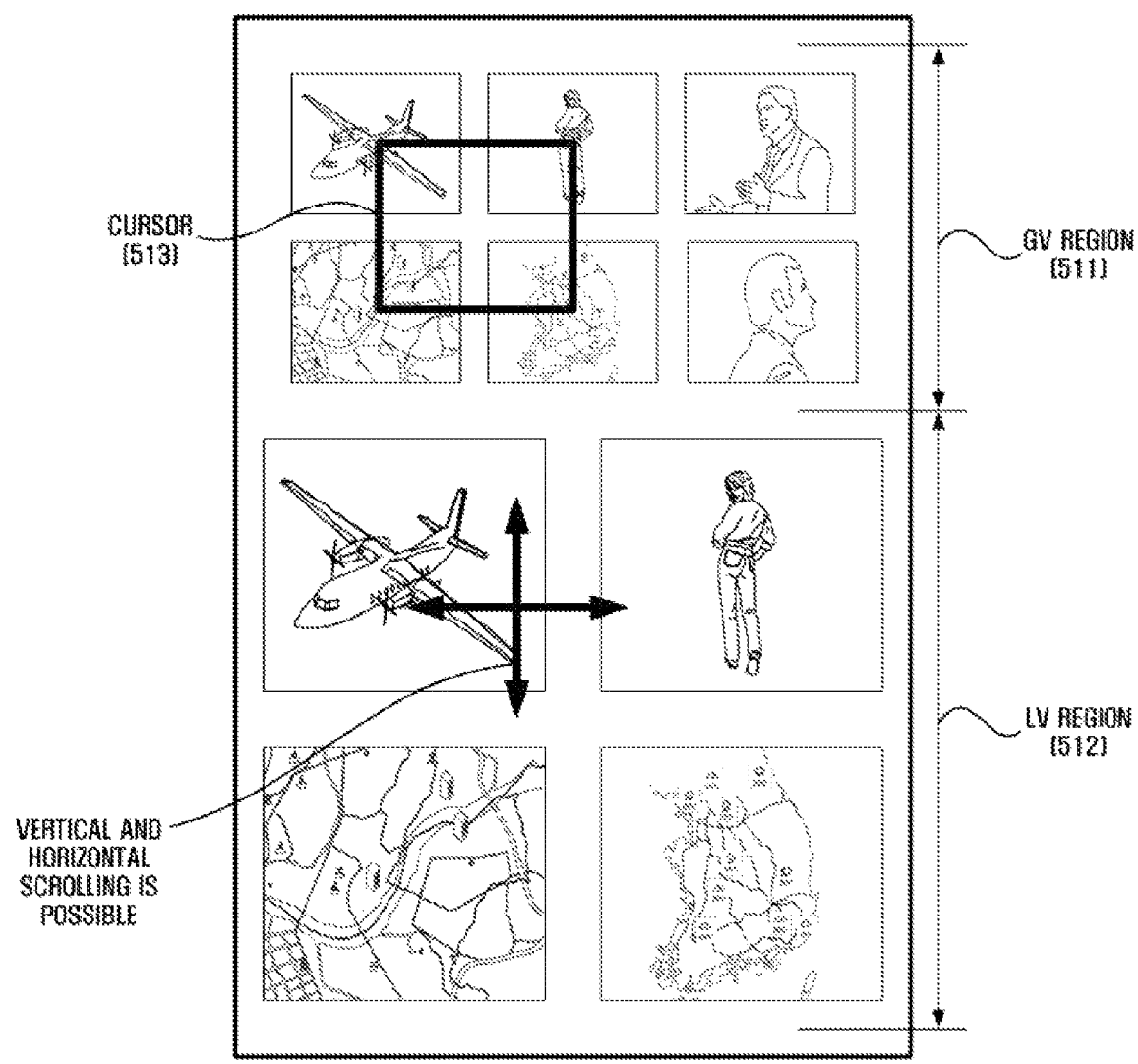
FIG. 5 is a diagram illustrating an aspect where a screen region is divided by a screen region control unit according to still another embodiment of the invention.

FIG. 5 is a diagram illustrating an aspect where a screen region is divided by a screen region control unit according to still another embodiment of the invention.

In the cases shown in FIGS. 3A to 3D and 4, the photos displayed in the LV region move by either vertical scrolling or horizontal scrolling, and the location of the cursor in the GV region is changed. In the case shown in FIG. 5, the photos displayed in the LV region 512 can move by both vertical scrolling and horizontal scrolling, and the location of the cursor 513 in the GV region 511 is changed according to the scrolling direction in the LV region 512.

Figure 6A:
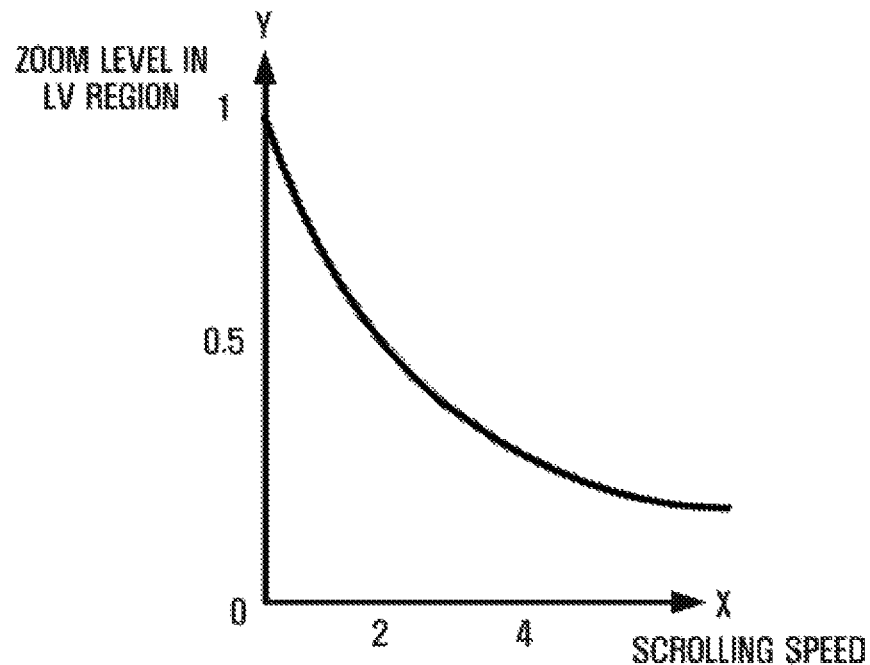
FIG. 6A is a graph illustrating a correlation between a scrolling speed and a zoom level in an LV region according to an embodiment of the invention.

FIG. 6A is a graph illustrating a correlation between a scrolling speed and a zoom level in an LV region according to an embodiment of the invention.

In FIG. 6A, an X axis denotes a scrolling speed and a Y axis denotes a zoom level in an LV region.

When the scrolling speed is approximately 0, the zoom level is at the maximum, and when the scrolling speed increases, the zoom level decreases.

Accordingly, when the scrolling speed is low or decreased, the photos are enlarged and displayed in the LV region for viewing the photos. Accordingly, the user can view the photos in detail.

Figure 6B:
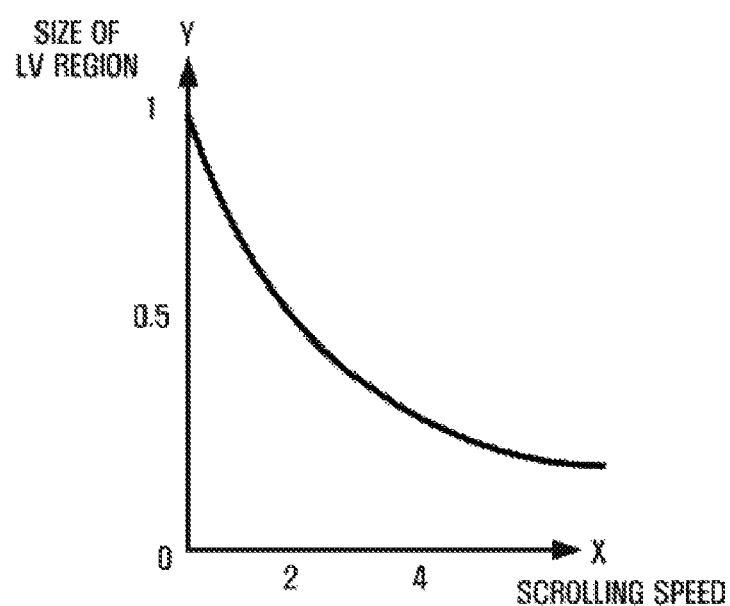
FIG. 6B is a graph illustrating a correlation between a scrolling speed and an LV region according to an embodiment of the invention.

FIG. 6B is a graph illustrating a correlation between a scrolling speed and an LV region according to an embodiment of the invention.

In FIG. 6B, an X axis denotes a scrolling speed and a Y axis denotes a size of an LV region.

From FIG. 6B, it can be understood that when the scrolling speed is approximately 0, the LV region is at the maximum enlargement, and when the scrolling speed increases, the LV region is reduced.

Accordingly, when the scrolling speed is low or decreased, the LV region for viewing the photos is enlarged. The photos are also enlarged and displayed and thus, the user can view the photos in detail.

Figure 6C:
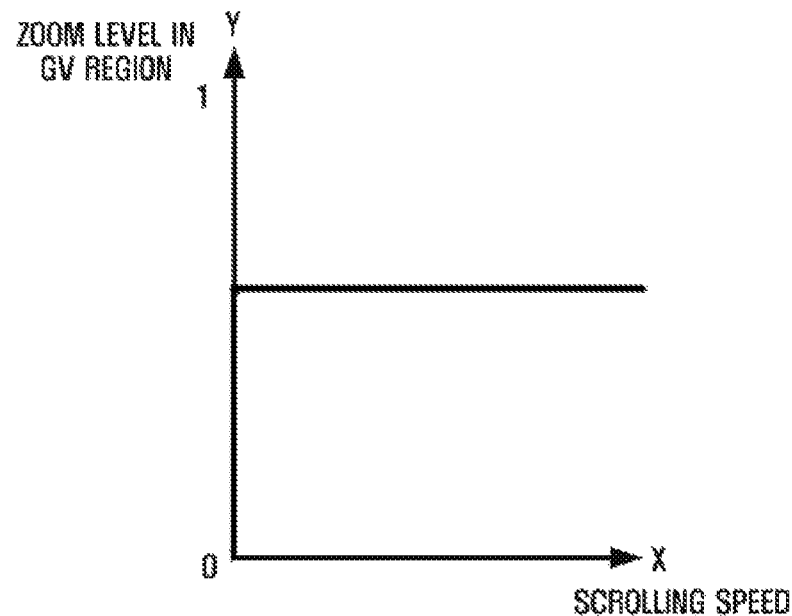
FIG. 6C is a graph illustrating a correlation between a scrolling speed and a zoom level in a GV region according to an embodiment of the invention.

FIG. 6C is a graph illustrating a correlation between a scrolling speed and a zoom level in a GV region according to an embodiment of the invention.

In FIG. 6C, an X axis denotes a scrolling speed and a Y axis denotes a zoom level in a GV region. From FIG. 6C, it can be understood that the zoom level is constant regardless of the scrolling speed.

That is, the sizes of the photos are not changed and the number of photos in the GV region is only changed.

Accordingly, when the scrolling speed is fast or increased, the number of photos that are in the form of thumbnails is increased and the photos are displayed, in the GV region for searching the photos. Therefore, the user can immediately recognize a large amount of photos and search a desired photo fast.

Figure 6D:
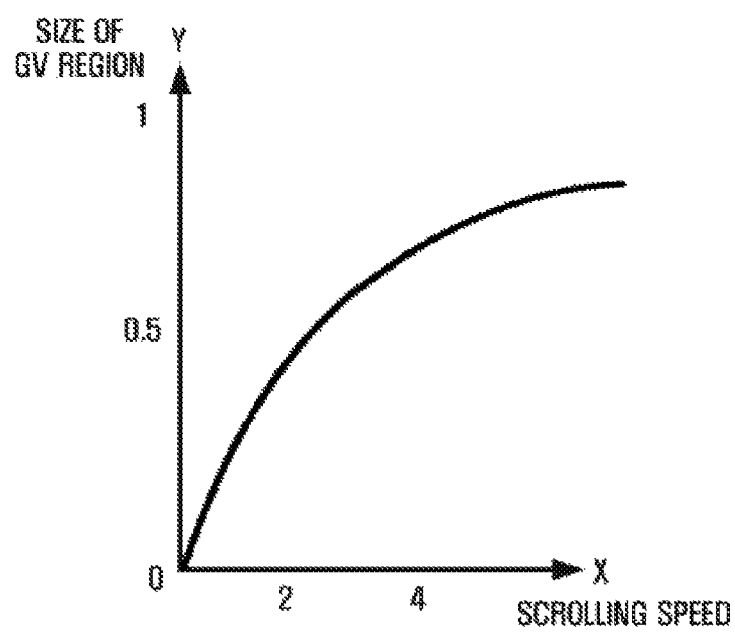
FIG. 6D is a graph illustrating a correlation between a scrolling speed and a GV region according to an embodiment of the invention.

FIG. 6D is a graph illustrating a correlation between a scrolling speed and a GV region according to an embodiment of the invention.

In FIG. 6D, an X axis denotes a scrolling speed and a Y axis denotes a size of a GV region.

When the scrolling speed is approximately 0, the GV region is at the minimum reduction, and when the scrolling speed increases, the GV region is enlarged.

Accordingly, when the scrolling speed is fast or increased, the GV region for searching the photos is enlarged. The number of photos that are in the form of thumbnails increases and the photos are displayed. The user can immediately recognize a large amount of photos and search a desired photo fast.

FIG. 7 is a flowchart illustrating a process of providing items based on scrolling according to an embodiment of the invention.

For convenience of explanation, the process of providing items on a scroll will be described with reference to the apparatus 200 shown in FIG. 2.

In the apparatus 200 shown in FIG. 2, the scrolling detecting unit 210 detects scrolling for one or more items that are displayed on the screen (Step S701).

In this case, the items mean at least one of one or more images, photos, documents, and menus. For convenience of explanation, the photos are exemplified as the items in this embodiment.

Further, the screen means a screen on an information apparatus, such as a portable terminal, a PC, and a TV. For convenience of explanation, a screen of a portable terminal, such as a digital camera, a cellular phone, a PMP, and a PDA, is exemplified in this embodiment.

The items and screen are not limited to those in the embodiments of the invention, and various changes and modifications can be made.

The scrolling is detected by the scrolling detecting unit 210 in Step S701. The scrolling can be performed by any one of the motion of a mouse in a PC, an inclination of a portable terminal, and the movement of an object (a portion of a body, such as fingers, and a stylus pen), which comes into contact with a screen of an information apparatus, when the screen is composed of a touch screen.

After Step S701, the scrolling detecting unit 210 calculates the scrolling speed according to the scrolling operation (Step S702).

After Step S702, the screen region control unit 220 divides the screen into one or more regions according to the scrolling speed that has been detected by the scrolling detecting unit 210, and controls the sizes of the divided regions (Step S703).

In this case, the screen regions, which are divided by the screen region control unit 220, include at least one of the GV region and the LV region. In the GV region, the plurality of photos are displayed in the form of thumbnails whose sizes are fixed to have predetermined sizes. In the LV region, one or more photos are enlarged to have predetermined sizes and displayed.

That is, the screen region control unit 220 controls the sizes of the GV region and the LV region according to the scrolling speed that has been calculated by the scrolling detecting unit 210, and determines the zoom level of the LV region according to the size of the LV region.

At this time, the screen region control unit 220 enlarges the GV region in proportion to the scrolling speed, and enlarges the LV region to be inversely proportional to the scrolling speed.

Accordingly, when the scrolling speed is low, the screen region control unit 220 determines that the user desires to view the photos in detail, and enlarges the LV region such that the photos are enlarged and displayed in order for the user to view the photos. In contrast, when the scrolling speed is fast, the screen region control unit 220 determines that the user desires to search the photos instead of viewing the photos in detail, and enlarges the GV region such that the plurality of photos are displayed in the form of thumbnails in order for the user to search the photos.

After Step S703, the item control unit 230 controls at least one of the sizes and the number of photos according to the sizes of the GV region and the LV region that have been divided by the screen region control unit 220 (Step S704).

For example, when the scrolling speed decreases, the screen region control unit 220 decreases the size of the GV region according to the decreased scrolling speed. The item control unit 230 decreases the number of photos that are in the form of thumbnails whose sizes are fixed to have predetermined sizes, according to the decreased size of the GV region, and displays the photos.

At this time, the reason why the number of photos that are in the form of thumbnails is decreased without decreasing the sizes of the photos according to the decreased size of the GV region is as follows. This is because each size of photos that are in the form of thumbnails is at the minimum size, which enables the user to easily search the photos.

After Step S704, the item control unit 230 locates the cursor to the photos that are in the form of thumbnails in the GV region, which correspond to the photos displayed currently in the LV region (Step S705).

If an area of the GV region is insufficient, all photos, which the user desires to view, cannot be displayed in the form of thumbnails in the GV region. In this case, the item control unit 230 displays some photos that are in the form of thumbnails, in the H*T rows in the GV region. The other photos, which are not displayed in the GV region, are displayed in the GV region and the screen is updated, when the cursor is out of the GV region for the cursor to move from the last photo displayed in the GV region to another photo.

At this time, as for the method of updating displayed photos, the uppermost row of the H*T rows may only be updated, the lowermost row may only be updated, or all the H*T rows may be updated.

Further, the item control unit 230 changes the sizes and the number of photos for viewing according to the changed size of the LV region and displays the photos.

Different from the GV region, the cursor does not exist in the LV region, and the photos move by scrolling. Further, in the LV region, the photos are enlarged or reduced by the item control unit 230 according to the changed size of the LV region.

At this time, the photos, which are enlarged or reduced in the LV region, are enlarged or reduced having a predetermined aspect ratio. Therefore, when the LV region is enlarged, the displayed photos are also enlarged having a predetermined aspect ratio.

In general, the photos are preferably enlarged or reduced having a predetermined aspect ratio. However, in some cases, the photos may be enlarged or reduced having a different aspect ratio according to the size of the LV region.

Accordingly, when the scrolling speed decreases and the LV region is enlarged, one photo is enlarged. As a result, the user can view the corresponding photo in detail.

In contrast, when the LV region is reduced, the displayed photos are also reduced having a predetermined aspect ratio. As a result, a large amount of photos are displayed in the LV region before the LV region is reduced.

After Step S705, if the scrolling operation by the user is detected, the processes of Steps S701 to S705 are repeatedly performed.

Although the invention has been described in connection with the exemplary embodiments of the invention, it will be apparent to those skilled in the art that various modifications and changes may be made thereto without departing from the scope and spirit of the invention. Therefore, it should be understood that the above embodiments are not limitative, but illustrative in all aspects.

According to the apparatus and method of providing items based on scrolling, the following effects can be achieved.

Since the user can view or search the photos, it is possible to reduce the amount of time that is required for the user to search and view the desired photos.

Further, it is not required to perform a mode conversion from the photo viewing mode to the photo searching mode or from the photo searching mode to the photo viewing mode.

Furthermore, the thumbnail screen having the fixed size can be automatically provided, when the user searches the photos while scrolling the photos at a high speed. Therefore, it is possible for the user to minimize the visual fatigue.

What is claimed is:

1. An apparatus comprising:
a screen having a display divisible into a first region to display at least one first item of a predetermined size and a second region to display at least one second item that is an enlarged display of one of the at least one first item;
at least one memory storing instructions; and
at least one hardware processor that executes the instructions stored in the at least one memory to cause the following to be performed:
determining a scrolling speed of the display on the screen of the apparatus, and
controlling a relative size of a displayed first region and a displayed second region based on the determined scrolling speed,
wherein the controlled size of the first region relative to the second region and the number of first items of the predetermined size displayed in the first region increase as the determined scrolling speed increases.

2. The apparatus of claim 1, wherein the scrolling of the display is performed by any one operation of a motion of a mouse, an inclination of the apparatus, and a movement of an object that comes into contact with the screen.

3. The apparatus of claim 2, wherein the at least one processor executes the instructions to calculate the speed of the scrolling performed by the operation.

4. The apparatus of claim 1, wherein the first items displayed in the first region are displayed in the form of thumbnails.

5. The apparatus of claim 1, wherein the second items displayed in the second region have predetermined sizes.

6. The apparatus of claim 5, wherein the at least one processor executes the instructions to control the size of the second region to be inversely proportional to the scrolling speed.

7. The apparatus of claim 5, wherein the at least one processor executes the instructions to change to control the sizes of the items displayed in the second region to be inversely proportional to the scrolling speed.

8. The apparatus of claim 1, wherein the at least one first item and the at least one second item include at least one of images, photos, documents, and menus.

9. The apparatus of claim 1, wherein the at least one processor executes the instructions to change the number of the first items included in the first region to be proportional to the displayed size of the first region.

10. The apparatus of claim 1, wherein the at least one processor executes the instructions to change both the size and the number of the second items displayed in the second region to be proportional to the displayed size of the second region.

* * * * *